United States Patent
Park et al.

(10) Patent No.: US 8,428,377 B2
(45) Date of Patent: Apr. 23, 2013

(54) DEVICE AND METHOD OF PROCESSING IMAGE DATA TO BE DISPLAYED ON A DISPLAY DEVICE

(75) Inventors: Deoksoo Park, Seoul (KR); SangJo Lee, Suwon-si (KR); Junghyun Lim, Suwon-si (KR); Hongki Kwon, Hwaseong-si (KR); SangHoon Ha, Seoul (KR); Byoung-Ju Song, Gwangju (KR)

(73) Assignee: Samsung Electronics Co., Ltd. (KR)

( * ) Notice: Subject to any disclaimer, the term of this patent is extended or adjusted under 35 U.S.C. 154(b) by 367 days.

(21) Appl. No.: 12/661,908

(22) Filed: Mar. 26, 2010

(65) Prior Publication Data

US 2011/0091122 A1  Apr. 21, 2011

(30) Foreign Application Priority Data

Oct. 15, 2009  (KR) .......................... 10-2009-0098373

(51) Int. Cl.
  *G06K 9/36* (2006.01)
  *G06K 9/46* (2006.01)
(52) U.S. Cl.
  USPC .......................................... 382/239; 382/232
(58) Field of Classification Search ................. None
  See application file for complete search history.

(56) References Cited

U.S. PATENT DOCUMENTS

| | | | |
|---|---|---|---|
| 6,407,729 | B1 | 6/2002 | Moon |
| 6,707,852 | B1 * | 3/2004 | Wang ........................ 375/240.12 |
| 7,148,868 | B2 | 12/2006 | Lee |
| 2006/0139287 | A1 * | 6/2006 | Kim et al. ....................... 345/98 |
| 2006/0152463 | A1 | 7/2006 | Furihata et al. |
| 2007/0285371 | A1 | 12/2007 | Nam et al. |
| 2008/0131087 | A1 | 6/2008 | Lee et al. |
| 2009/0109133 | A1 * | 4/2009 | Park ................................ 345/55 |

FOREIGN PATENT DOCUMENTS

| | | |
|---|---|---|
| JP | 2005091454 | 4/2005 |
| JP | 2006195170 | 7/2006 |
| JP | 2007334321 | 12/2007 |
| KR | 1020070118445 A | 12/2007 |

* cited by examiner

*Primary Examiner* — Li Liu
(74) *Attorney, Agent, or Firm* — Onello & Mello, LLP

(57) ABSTRACT

In an image data processing device, a selection unit receives a block of original image data of a current image, a block of compressed and reconstructed image data of the current image, and a block of compressed and reconstructed data of a previous image that precedes the current image. A comparison unit compares the block of compressed and reconstructed image data of the current image with the block of compressed and reconstructed data of the previous image. An output unit, in the event that the comparison of the comparison unit results in a match, outputs the block of original image data of the current image as first output data, and, in the event that the comparison of the comparison unit does not result in a match, outputs the block of compressed and reconstructed data of the previous image as the first output data.

20 Claims, 13 Drawing Sheets

Compression Block (CB)

Consistency Determination

DEVICE AND METHOD OF PROCESSING IMAGE DATA TO BE DISPLAYED ON A DISPLAY DEVICE

CROSS-REFERENCE TO RELATED APPLICATIONS

A claim of priority is made under 35 U.S.C §119 to Korean Patent Application No. 10-2009-0098373, filed Oct. 15, 2009, the entire content of which is incorporated herein by reference.

BACKGROUND

Embodiments of the present inventive concept relate to electronic devices, and more particularly, embodiments of the present inventive concept relate to a device and a method of processing image data to be displayed on a display device.

A block diagram schematically depicting a conventional display system is illustrated in FIG. 1. A conventional display system 10 generally includes: a data compression unit 12 configured to compress image data from an external source; a memory device 14, also referred to as a frame buffer, for temporarily storing image data compressed by the data compression unit 12; a data reconstruction unit 16 configured to reconstruct compressed image data stored in the memory device 14; and a display panel 18 configured to display the compressed/reconstructed image data provided by the data reconstruction unit 16. In the above-described display system, it is possible to reduce the size of the memory device 14 by performing a compression operation on image data that is sent to the display panel 18.

There is a continuing consumer demand for increased size in the display panel 18. As a result, there is a corresponding increase in the amount of image data to be processed and transferred to the display panel 18. Assuming that the compression rate of the data compression unit 12 is maintained, the required size of the memory device 14 and any associated input/output bandwidth will increase in proportion to the increased amount of image data. At the same time, if the compression rate of the data compression unit 12 is increased, it is possible to limit any increase in, or to reduce, the size of the memory device 14 and the associated input/output bandwidth.

However, in the event that image data is compressed using a high compression rate, there is an associated increased loss of the image data. As a result, the picture quality of an image being displayed on the display panel 18 will suffer.

SUMMARY

Embodiments of the present inventive concept are directed to apparatus and methods that process image data using data compression in a manner that does not adversely impact picture quality.

In one aspect, an image data processing device, comprising: a selection unit that receives a block of original image data of a current image, a block of compressed and reconstructed image data of the current image, and a block of compressed and reconstructed data of a previous image that precedes the current image; a comparison unit that compares the block of compressed and reconstructed image data of the current image with the block of compressed and reconstructed data of the previous image; and an output unit that, in the event that the comparison of the comparison unit results in a match, outputs the block of original image data of the current image as first output data, and that, in the event that the comparison of the comparison unit does not result in a match, outputs the block of compressed and reconstructed data of the previous image as the first output data.

In one embodiment, the image data processing device further comprises a dynamic capacitance compensation (DCC) circuit comprising: a first input that receives the block of original image data of the current image; a second input that receives the first output data output by the output unit; and a converter unit that generates compensated image data based on differences between the block of original image data of the current image and the first output data output by the output unit.

In another embodiment, the comparison unit compares the block of compressed and reconstructed image data of the current image with the block of compressed and reconstructed data of the previous image by: comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match.

In another embodiment, the comparison unit compares the block of compressed and reconstructed image data of the current image with the block of compressed and reconstructed data of the previous image by: computing a motion vector of the block of original image data of the current image relative to the block of compressed and reconstructed data of the previous image; comparing pixel values of pixels of the motion vector with corresponding pixel values of pixels of the block of compressed and reconstructed data of the previous image; and in the event that the pixel values are similar within an acceptable limit, determining the result of the comparison to be a match.

In another embodiment, the image data processing device further comprises an error correcting unit that corrects errors in the computing of the motion vector.

In another embodiment, the image data processing device further comprises an error correcting unit that corrects errors in the comparing of the pixel values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; comparing color values of the first motion vector with color values of the block of compressed and reconstructed data of the previous image; and in the event that the color values are similar within an acceptable limit, determining the result of the comparison to be a match.

In another embodiment, the comparison unit compares the color values by comparing average color values of each color component of the motion vector with average color values of each color component of the block of compressed and reconstructed data of the previous image.

In another embodiment, the image data processing device further comprises an error correcting unit that corrects errors in the computing of the motion vector.

In another embodiment, the image data processing device further comprises an error correcting unit that corrects errors in the comparing of the color values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; comparing frequency characteristic values of the first motion vector with frequency characteristic values of the block of compressed and reconstructed data of the previous image; and in the event that the frequency characteristic values are similar within an acceptable limit, determining the result of the comparison to be a match.

In another embodiment, the comparison unit compares the frequency characteristic values by: first comparing pixel values of each pixel of the motion vector with an average pixel value to generate first frequency characteristic values; and second comparing pixel values of each pixel of the block of compressed and reconstructed data of the previous image with an average pixel value to generate second frequency characteristic values.

In another embodiment, the image data processing device further comprises an error correcting unit that corrects errors in the computing of the motion vector.

In another embodiment, the image data processing device further comprises an error correcting unit that corrects errors in the comparing of the frequency characteristic values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; computing a sum of absolute differences (SAD) of the motion vector; comparing the sum of absolute differences of the motion vector to a reference value; and in the event that the sum of absolute differences (SAD) is less than the reference value, determining the result of the comparison to be a match.

In another embodiment, the reference value is determined in response to an error rate of a mode of operation of data compression for the image data processing device.

In another embodiment, the image data processing device further comprises an error correcting unit that corrects errors in the computing of the motion vector.

In another embodiment, the image data processing device further comprises an error correcting unit that corrects errors in the computing of the sum of absolute differences (SAD) of the motion vector.

In another aspect, an image data display system comprises: a timing control unit, comprising: a selection unit that receives a block of original image data of a current image, a block of compressed and reconstructed image data of the current image, and a block of compressed and reconstructed data of a previous image that precedes the current image; a comparison unit that compares the block of compressed and reconstructed image data of the current image with the block of compressed and reconstructed data of the previous image; and an output unit that, in the event that the comparison of the comparison unit results in a match, outputs the block of original image data of the current image as first output data, and that, in the event that the comparison of the comparison unit does not result in a match, outputs the block of compressed and reconstructed data of the previous image as the first output data; and a dynamic capacitance compensation (DCC) circuit comprising: a first input that receives the block of original image data of the current image; a second input that receives the first output data output by the output unit; and a converter unit that generates compensated image data based on differences between the block of original image data of the current image and the first output data output by the output unit; and a display device that displays the compensated image data.

In one embodiment, the comparison unit compares the block of compressed and reconstructed image data of the current image with the block of compressed and reconstructed data of the previous image by: comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match.

In another embodiment, the comparison unit compares the block of compressed and reconstructed image data of the current image with the block of compressed and reconstructed data of the previous image by: computing a motion vector of the block of original image data of the current image relative to the block of compressed and reconstructed data of the previous image; comparing pixel values of pixels of the motion vector with corresponding pixel values of pixels of the block of compressed and reconstructed data of the previous image; and in the event that the pixel values are similar within an acceptable limit, determining the result of the comparison to be a match.

In another embodiment, the image data display system further comprises an error correcting unit that corrects errors in the computing of the motion vector.

In another embodiment, the image data display system further comprises an error correcting unit that corrects errors in the comparing of the pixel values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; comparing color values of the first motion vector with color values of the block of compressed and reconstructed data of the previous image; and in the event that the color values are similar within an acceptable limit, determining the result of the comparison to be a match.

In another embodiment, the comparison unit compares the color values by comparing average color values of each color component of the motion vector with average color values of each color component of the block of compressed and reconstructed data of the previous image.

In another embodiment, the image data display system further comprises an error correcting unit that corrects errors in the computing of the motion vector.

In another embodiment, the image data display system further comprises an error correcting unit that corrects errors in the comparing of the color values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; comparing frequency characteristic values of the first motion vector with frequency characteristic values of the block of compressed and reconstructed data of the previous image; and in the event that the frequency characteristic values are similar within an acceptable limit, determining the result of the comparison to be a match.

In another embodiment, the comparison unit compares the frequency characteristic values by: first comparing pixel values of each pixel of the motion vector with an average pixel value to generate first frequency characteristic values; and second comparing pixel values of each pixel of the block of compressed and reconstructed data of the previous image with an average pixel value to generate second frequency characteristic values.

In another embodiment, the image data display system further comprises an error correcting unit that corrects errors in the computing of the motion vector.

In another embodiment, the image data display system further comprises an error correcting unit that corrects errors in the comparing of the frequency characteristic values.

In another embodiment, the comparison unit compares the block of compressed and reconstructed image data of the current image with the block of compressed and reconstructed data of a previous image by: computing a motion vector of the block of original image data of the current image relative to the block of compressed and reconstructed data of the previous image; computing a sum of absolute differences (SAD) of the motion vector; comparing the sum of absolute differences of the motion vector to a reference value; and in the event that the sum of absolute differences (SAD) is less than the reference value, determining the result of the comparison to be a match.

In another embodiment, the reference value is determined in response to an error rate of a mode of operation of data compression for the timing control unit.

In another embodiment, the image data display system further comprises an error correcting unit that corrects errors in the computing of the motion vector.

In another embodiment, the image data display system further comprises an error correcting unit that corrects errors in the computing of the sum of absolute differences (SAD) of the motion vector.

In another aspect, a method of processing image data, comprises: receiving a block of original image data of a current image, a block of compressed and reconstructed image data of the current image, and a block of compressed and reconstructed data of a previous image that precedes the current image; comparing the block of compressed and reconstructed image data of the current image with the block of compressed and reconstructed data of the previous image; and in the event that the comparing results in a match, outputting the block of original image data of the current image as first output data; and in the event that the comparing does not result in a match, outputting the block of compressed and reconstructed data of the previous image as the first output data.

In one embodiment, the method further comprises generating compensated image data based on differences between the block of original image data of the current image and the first output data output by the output unit.

In another embodiment, comparing the block of compressed and reconstructed image data of the current image with the block of compressed and reconstructed data of the previous image comprises: comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match.

In another embodiment, comparing the block of compressed and reconstructed image data of the current image with the block of compressed and reconstructed data of the previous image comprises: computing a motion vector of the block of original image data of the current image relative to the block of compressed and reconstructed data of the previous image; comparing pixel values of pixels of the motion vector with corresponding pixel values of pixels of the block of compressed and reconstructed data of the previous image; and in the event that the pixel values are similar within an acceptable limit, determining the result of the comparison to be a match.

In another embodiment, the method further comprises correcting errors in the computing of the motion vector.

In another embodiment, the method further comprises correcting errors in the comparing of the pixel values.

In another embodiment, comparing the block of compressed and reconstructed image data of the current image with the block of compressed and reconstructed data of a previous image comprises: computing a motion vector of the block of original image data of the current image relative to the block of compressed and reconstructed data of the previous image; comparing color values of the first motion vector with color values of the block of compressed and reconstructed data of the previous image; and in the event that the color values are similar within an acceptable limit, determining the result of the comparison to be a match.

In another embodiment, comparing the color values further comprises comparing average color values of each color component of the motion vector with average color values of each color component of the block of compressed and reconstructed data of the previous image.

In another embodiment, the method further comprises correcting errors in the computing of the motion vector.

In another embodiment, the method further comprises correcting errors in the comparing of the color values.

In another embodiment, comparing the block of compressed and reconstructed image data of the current image with the block of compressed and reconstructed data of a previous image comprises: computing a motion vector of the block of original image data of the current image relative to the block of compressed and reconstructed data of the previous image; comparing frequency characteristic values of the first motion vector with frequency characteristic values of the block of compressed and reconstructed data of the previous image; and in the event that the frequency characteristic values are similar within an acceptable limit, determining the result of the comparison to be a match.

In another embodiment, comparing the frequency characteristic values comprises: first comparing pixel values of each pixel of the motion vector with an average pixel value to generate first frequency characteristic values; and second comparing pixel values of each pixel of the block of compressed and reconstructed data of the previous image with an average pixel value to generate second frequency characteristic values.

In another embodiment, the method further comprises correcting errors in the computing of the motion vector.

In another embodiment, the method further comprises correcting errors in the comparing of the frequency characteristic values.

In another embodiment, comparing the block of compressed and reconstructed image data of the current image with the block of compressed and reconstructed data of a previous image comprises: computing a motion vector of the block of original image data of the current image relative to the block of compressed and reconstructed data of the previous image; computing a sum of absolute differences (SAD) of the motion vector; comparing the sum of absolute differences of the motion vector to a reference value; and in the event that the sum of absolute differences (SAD) is less than the reference value, determining the result of the comparison to be a match.

In another embodiment, the reference value is determined in response to an error rate of a mode of operation of the data compression.

In another embodiment, the method further comprises correcting errors in the computing of the motion vector.

In another embodiment, the method further comprises correcting errors in the computing of the sum of absolute differences (SAD) of the motion vector.

In another aspect, a method of processing image data, comprises: receiving a block of original image data of a current image, a block of compressed and reconstructed image data of the current image, and a block of compressed and reconstructed data of a previous image that precedes the current image; comparing the block of compressed and reconstructed image data of the current image with the block of compressed and reconstructed data of the previous image according to a priority order: in a first priority of the priority order: comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match; and in a second priority of the priority order: computing a motion vector of the block of original image data of the current image relative to the block of compressed and reconstructed data of the previous image; comparing parameters of the motion vector with corresponding parameters of the block of compressed and reconstructed data of the previous image; and in the event that the parameters are similar within an acceptable limit, determining the result of the comparison to be a match; and in the event that the comparing results of the priority order result in a match, outputting the block of original image data of a current image as first output data; and in the event that the comparing results of the priority order do not result in a match, outputting the block of compressed and reconstructed data of the previous image as the first output data.

In one embodiment, the method further comprises generating compensated image data based on differences between the block of original image data of the current image and the first output data output by the output unit.

In another embodiment, comparing parameters of the motion vector with corresponding parameters of the block of compressed and reconstructed data of the previous image comprises comparing pixel values of pixels of the motion vector with corresponding pixel values of pixels of the block of compressed and reconstructed data of the previous image; and, in the event that the pixel values are similar within an acceptable limit, determining the result of the comparison to be a match.

In another embodiment, comparing parameters of the motion vector with corresponding parameters of the block of compressed and reconstructed data of the previous image comprises comparing color values of the first motion vector with color values of the block of compressed and reconstructed data of the previous image; and, in the event that the color values are similar within an acceptable limit, determining the result of the comparison to be a match.

In another embodiment, comparing the color values further comprises comparing average color values of each color component of the motion vector with average color values of each color component of the block of compressed and reconstructed data of the previous image.

In another embodiment, comparing parameters of the motion vector with corresponding parameters of the block of compressed and reconstructed data of the previous image comprises comparing frequency characteristic values of the first motion vector with frequency characteristic values of the block of compressed and reconstructed data of the previous image; and, in the event that the frequency characteristic values are similar within an acceptable limit, determining the result of the comparison to be a match.

In another embodiment, comparing the frequency characteristic values comprises: first comparing pixel values of each pixel of the motion vector with an average pixel value to generate first frequency characteristic values; and second comparing pixel values of each pixel of the block of compressed and reconstructed data of the previous image with an average pixel value to generate second frequency characteristic values.

In another embodiment, the method further comprises in a in a third priority of the priority order: computing a motion vector of the block of original image data of the current image relative to the block of compressed and reconstructed data of the previous image; computing a sum of absolute differences (SAD) of the motion vector; comparing the sum of absolute differences of the motion vector to a reference value; and in the event that the sum of absolute differences (SAD) is less than the reference value, determining the result of the comparison to be a match.

In another embodiment, the reference value is determined in response to an error rate of a mode of operation of the data compression.

BRIEF DESCRIPTION OF THE FIGURES

The above and other objects and features of the embodiments of the present inventive concept will become apparent from the following description with reference to the following figures, wherein like reference numerals refer to like parts throughout the various figures unless otherwise specified, and wherein.

DETAILED DESCRIPTION OF EMBODIMENTS

Figure 1:
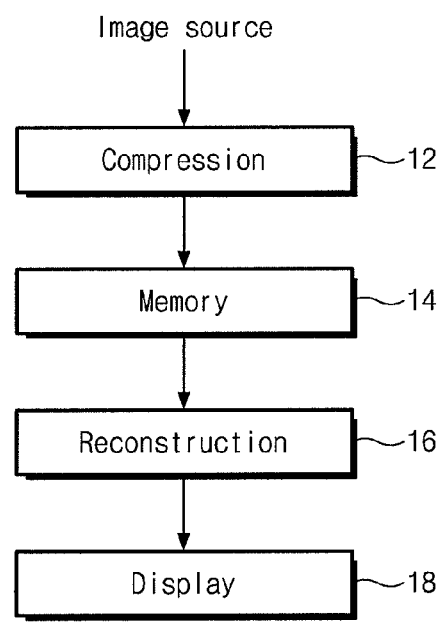
FIG. 1 is a block diagram schematically illustrating a conventional display system.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer or element is referred to as being "between" two layers, it can be the only layer or element between the two layers or elements, or one or more intervening layers or elements may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 2:
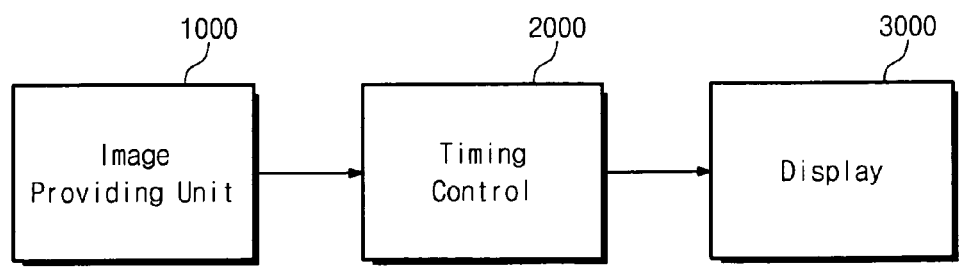
FIG. 2 is a block diagram schematically illustrating a display system according to an exemplary embodiment of the inventive concept.

FIG. 2 is a block diagram schematically illustrating a display system according to an exemplary embodiment of the inventive concept. A display system according to an exemplary embodiment of the inventive concept may be a display system related to a liquid crystal display (LCD) system or light emitting diode (LED) display system. However, it is apparent that a display system according to an exemplary embodiment of the inventive concept is not limited to these specific display technologies, and may include other types of display technologies that utilize data compression techniques.

Referring to FIG. 2, a display system according to an exemplary embodiment of the inventive concept can include an image data providing unit 1000, a timing control unit 2000, and a display panel 3000. The image data providing unit 1000 can be configured to provide image data (for example, RGB data) to the timing control unit 2000. For example, the image data providing unit 1000 can comprise an image data receiver of a digital TV such as a set-top box or the like. It is well understood to those of skill in the art that the image data providing unit 1000 is not thus limited, and can include many other types of sources of image data. For example, in a case whereby the display system is applied to a computing system, the image data providing unit 1000 can comprise a computer. The timing control unit 2000 controls the timing of the providing of image data from the image data providing unit 1000 to be displayed on the display panel 3000.

As described above, the display panel 3000 can include a digital television panel, a computer monitor, and other types of display panels for displaying image data. Although not shown in the figures, the display panel 3000 can include a pixel array, a gate driver, a source/data driver, and the like. An exemplary display panel is disclosed in U.S. Pat. No. 6,407,729, entitled "LCD DEVICE DRIVING SYSTEM AND AN LCD PANEL DRIVING METHOD", the entire content of which is incorporated herein by reference.

In an exemplary embodiment of the inventive concept, the timing control unit 2000 can be configured to compress image data provided by the image data providing unit 1000, to temporarily store the compressed image data, and to reconstruct the compressed image data. In particular, the display system and the display method in accordance with exemplary embodiments of the prevent invention can prevent the picture quality of an image from being adversely affected due to compression error, or data loss, even in the event that the image data compression rate is increased. This feature, and other features, will be more fully described herein.

Figure 3:
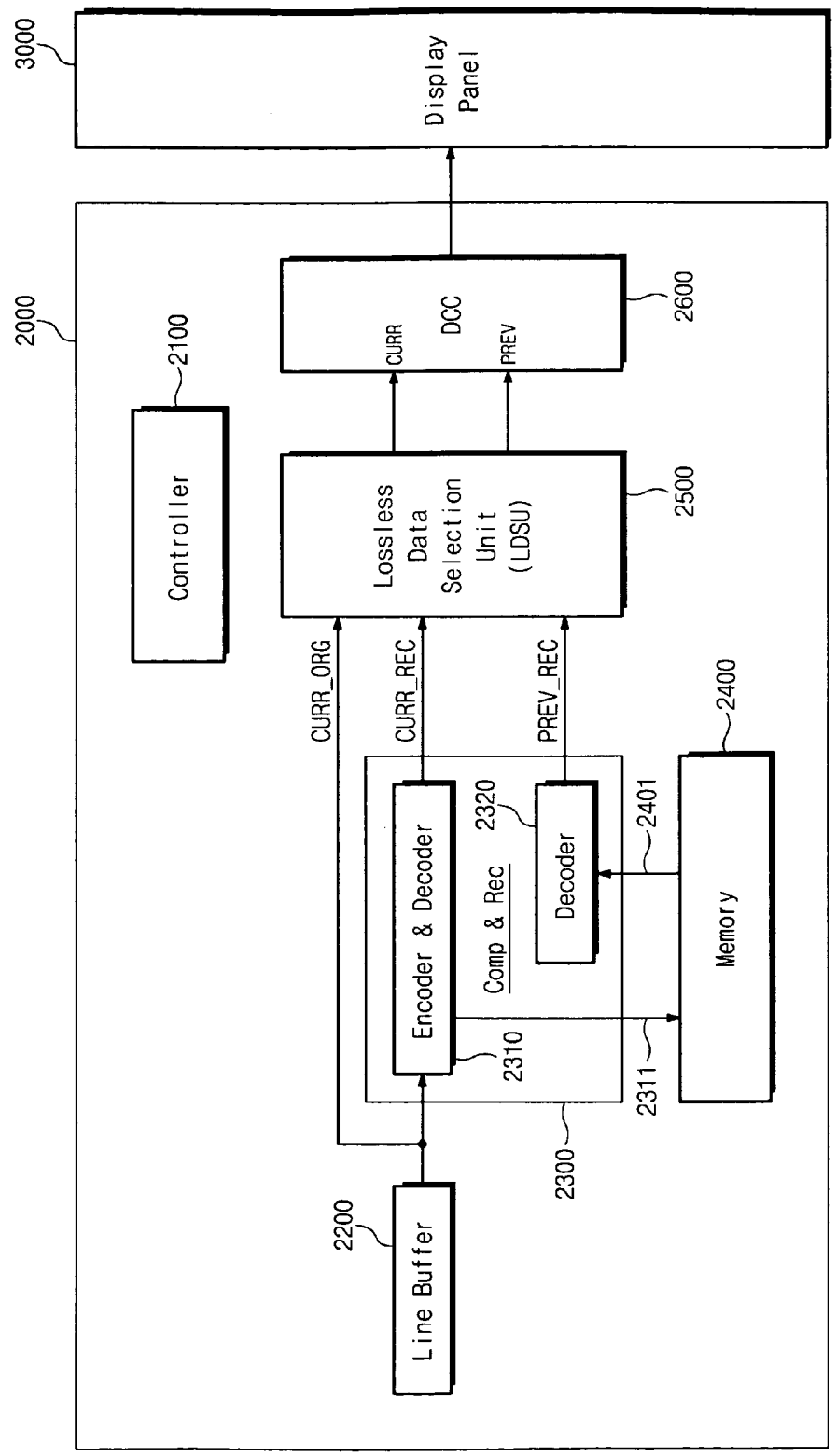
FIG. 3 is a block diagram schematically illustrating a timing control unit of FIG. 2 according to an exemplary embodiment of the inventive concept.

FIG. 3 is a block diagram schematically illustrating a timing control unit 200 of FIG. 2 according to an exemplary embodiment of the inventive concept.

Referring to FIG. 3, a timing control unit 2000 can include a controller 2100, a line buffer 2200, a data compression and reconstruction block 2300, a memory device 2400, a lossless data selection unit (LDSU) 2500, and a dynamic capacitance compensation (DCC) circuit 2600.

The controller 2100 can be configured to control the overall operation of the timing control unit 2000. In one embodiment, the line buffer 2200 stores image data in a linear unit. Image data stored in the line buffer 2200 can be provided to the data compression and reconstruction block 2300 in units referred to as compression block units. In an exemplary embodiment of the inventive concept, image data including a search range, or a motion estimation range, of a compression block can be stored in the line buffer 2200. For example, if a size of the compression block is 2×2 and its search range is 8×8, image data corresponding to eight lines may be stored in the line buffer 2200. Image data, or image frame data, can include RGB data for each of a plurality of pixels.

The data compression and reconstruction block 2300 can include an encoder/decoder unit 2310 and a decoder unit 2320. The encoder/decoder unit 2310 can be configured to compress image data of a compression block provided from the line buffer 2200 and to output the compressed data 2311 to the memory device 2400 in a bit stream. Further, the encoder/decoder unit 2310 can be configured to reconstruct the compressed data of the current image. The resulting compressed/reconstructed data of the current image CURR_REC can be provided to the lossless data selection unit 2500. The compressed data 2311 of the image data compressed by the encoder/decoder unit 2310 can be stored in the memory device 2400.

The compressed data 2311 output by the encoder/decoder and stored in the memory 2400 can be used by the timing control unit 2000 as data of a previous image. To achieve this, the decoder unit 2320 can be configured to retrieve the compressed data 2311 of a previous image, and not the current image, along data path 2401 from the memory device 2400, and to reconstruct the compressed data of a compression block of a previous image. The thus compressed/reconstructed data can thereby be provided to the lossless data selection unit 2500 as compressed/reconstructed data of a previous image PREV_REC.

An example embodiment of the data compression and reconstruction block 2300 is disclosed in U.S. Patent Application Publication No. 2008-0131087, entitled "METHOD, MEDIUM, AND SYSTEM VISUALLY COMPRESSING IMAGE DATA", the content of which is incorporated herein by reference. According to the embodiments disclosed in this reference, the data compression and reconstruction block 2300 can be configured to compress data using various data compression techniques, for example, Differential Pulse Code Modulation (DPCM) and Pulse Code Modulation (PCM). The data compression and reconstruction block 2300 can compress data respectively according to a plurality of compression modes and output data compressed according to a selected mode of the plurality of modes. The resulting error rates of data respectively compressed according to the modes may be different from one another.

Continuing to refer to FIG. 3, the lossless data selection unit 2500 receives, for example, compressed/reconstructed data of a current image CURR_REC and compressed/reconstructed data of a previous image PREV_REC from the data compression and reconstruction block 2300. The lossless data selection unit 2500 further receives original or raw data of a current image CURR_ORG from the line buffer 2200. The received data CURR_REC and PREV_REC is in the form of compressed and reconstructed data, while the received data CURR_ORG is raw data of a current image that is neither compressed nor reconstructed. The lossless data selection unit 2500 operates to determine whether image data of a compression block identical to, or identical within an allowable error range to, compressed/reconstructed data of a previous image exists within a current image, or within a search range of a current image, based on the received data CURR_REC, PREV_REC, and CURR_ORG.

If data identical to compressed/reconstructed data of a previous image PREV_REC is determined to exist within a current image, the lossless data selection unit 2500 can select raw data of a current image CURR_ORG instead of compressed/reconstructed data of a previous image PREV_REC, for transmission as an input PREV of the DCC circuit 2600, that is, previous image data thereof. On the other hand, if data identical to compressed/reconstructed data of a previous image is determined to not exist within a current image, the lossless data selection unit 2500 can select compressed/reconstructed data of a previous image PREV_REC as an input PREV of the DCC circuit, that is, previous image data thereof.

The DCC circuit 2600 can be configured to selectively compensate data of a current image according to a difference between previous image data PREV and current image data CURR which are provided by the lossless data selection circuit 2500. Such compensation improves the response time of a display device.

As understood from the above description, in accordance with embodiments of the present inventive concept, the lossless data selection circuit 2500 makes a determination as to which data is to be provided to the previous image data input PREV of the DCC circuit 2600. Namely, the compressed and reconstructed data of a current image CURR_REC is compared with compressed and reconstructed data of a previous image PREV_REC by the lossless data selection circuit 2500.

In the event the comparison between the CURR_REC and PREV_REC data is determined to be a match, or alternatively within a permissible error range, then it is determined that that portion of the image is unchanged or still. Since that portion is determined to be unchanged or still, the lossless data selection circuit 2500 operates to apply the original or raw data of the current image CURR_ORG as the previous image data input PREY of the DCC circuit 2600. As a result, the original or raw data of the current image CURR_ORG is provided as the current image data input CURR of the DCC circuit, and the same original or raw data of the current image CURR_ORG is provided as the previous image data input PREV of the DCC circuit. Assuming operation under the conventional approach, in this case, if the PREV_REC data, which includes compression error, is provided to the PREY input of the DCC circuit 2600, this PREV_REC data will not match the CURR_ORG data, and thus the DCC circuit 2600 will apply the compression error of the PREV_REC data to the image of the display panel. In contrast, since embodiments of the present inventive concept apply the data of the current image CURR_ORG as the previous image data input PREV of the DCC circuit 2600 in this scenario, no compression error is introduced to the image. As a result, the image quality is preserved, since the original image data is used, and compression error is thereby minimized.

Figure 4:
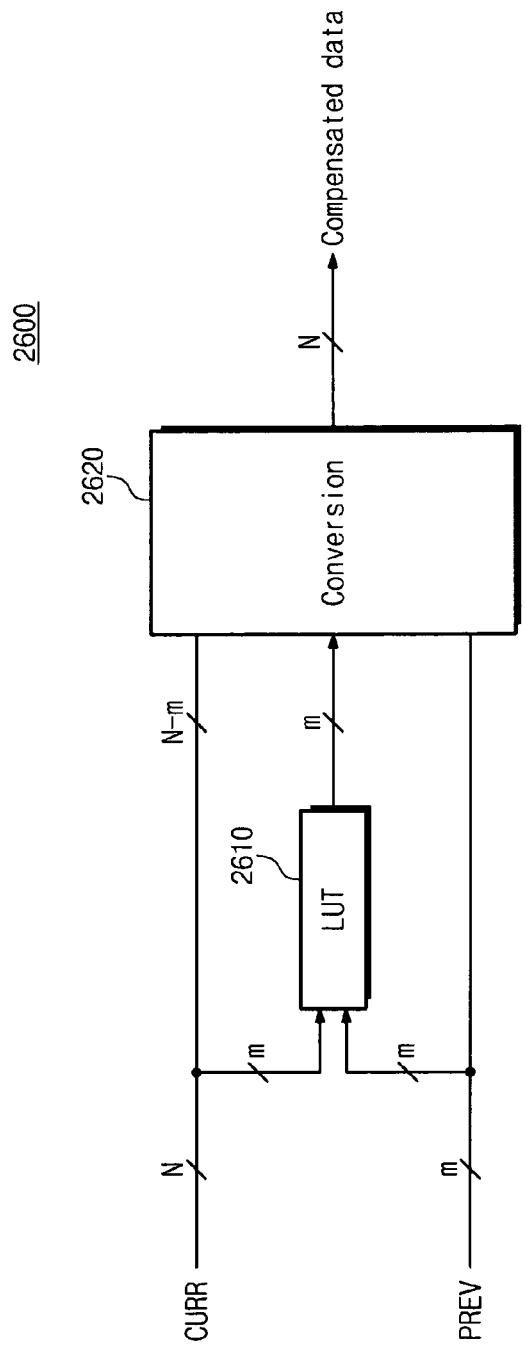
FIG. 4 is a block diagram schematically illustrating a dynamic capacitance compensation (DCC) circuit illustrated in FIG. 3.

FIG. 4 is a block diagram schematically illustrating an embodiment of a dynamic capacitance compensation (DCC) circuit illustrated in FIG. 3.

Referring to FIG. 4, a DCC circuit 2600 can include a lookup table (LUT) 2610 and a conversion unit 2620. The LUT 2610 stores compensation values that are used to compensate the pixel data of a current image. Previous image data PREV and current image data CURR are provided to the LUT 2610. One of compensation values in the LUT 2610 is selected using the received previous image data PREV and current image data CURR as row and column addresses to the table. In some embodiments, the compensation values in the LUT 2610 are selected using upper m-bit data of the received previous image data PREV and current image data CURR as row and column addresses. The conversion unit 2620 can be configured to determine whether a difference between the received current image data CURR and received previous image data PREV is less than a reference value. If a difference between the received current image data CURR and received previous image data PREV is determined to be more than a reference value, the conversion unit 2620 can operate to compensate pixel data of a current image based on the selected compensation value. The compensated data can then be provided to a display panel 3000. If a difference between the received current image data CURR and received previous image data PREV is less than a reference value, the conversion unit 2620 can operate to output pixel data of a current image in its present state, that is, without conversion or compensation.

It is well understood that a configuration of the DCC circuit 2600 is not limited to the embodiments depicted in this disclosure. Various examples of the DCC circuit 2600 are disclosed in U.S. Pat. No. 7,148,868, entitled "LIQUID CRYSTAL DISPLAY", the content of which is incorporated herein by reference.

Figure 5:
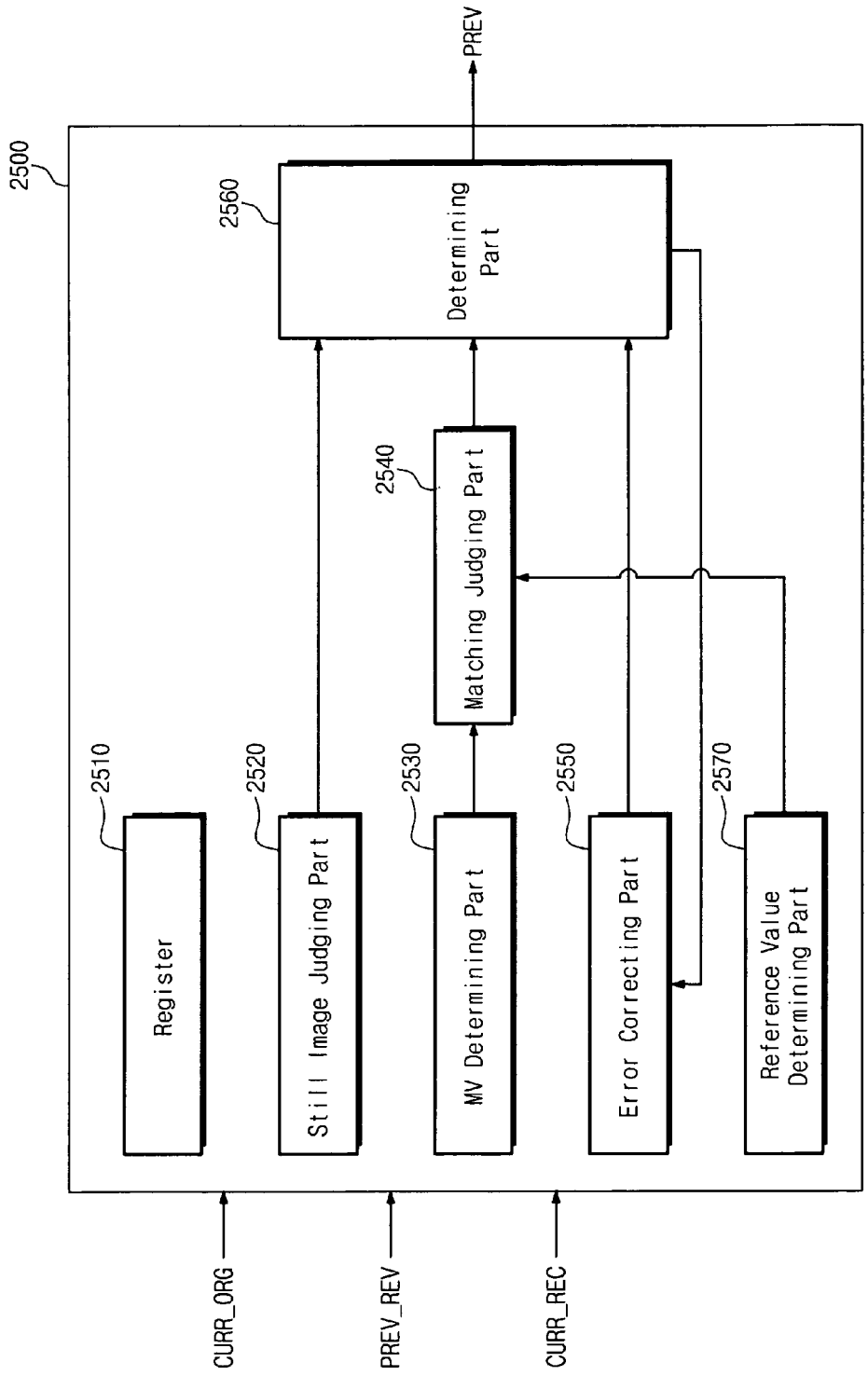
FIG. 5 is a block diagram schematically illustrating a lossless data selection unit of FIG. 3 according to an exemplary embodiment of the inventive concept.

FIG. 5 is a block diagram schematically illustrating a lossless data selection unit of FIG. 3 according to an exemplary embodiment of the inventive concept.

A lossless data selection unit 2500 according to an exemplary embodiment of the inventive concept can be configured to select either raw data of a current image CURR_ORG or compressed/reconstructed data of a previous image PREV_REC to be output as the previous image data signal PREV for the DCC circuit 2600. This selection can be determined, for example, in response to a determination of whether compressed/reconstructed image data of a current compression block CURR_REC identical to, or identical within an permissible error range to, compressed/reconstructed image data of a previous compression block PREV_REC exists within a current image, or within a search range of a current image. Various example operations for making this determination will be more fully described below.

Referring to FIG. 5, the lossless data selection unit 2500 may include a register 2510, a still image judging unit 2520, a motion vector determining unit 2530, a matching judging unit 2540, an error correcting unit 2550, a determining unit 2560, and a reference value determining unit 2570.

The register 2510 can be used to store image data corresponding to a search range, for example corresponding to a motion estimation range of a compression block, among data corresponding to a plurality of lines stored in a line buffer 2200, under the control of a controller 2100. The still image judging unit 2520 operates to determine whether a current image is a still image, based on a comparison between compressed/reconstructed data of a previous image PREV_REC and compressed/reconstructed data of a current image CURR_REC. The motion vector determining unit 2530 determines a motion vector MV of the current image based on compressed/reconstructed data of a previous image PREV_REC and image data within a search range, or within a motion estimation range of a compression block. The matching judging unit 2540 is configured to determine the matching of a motion vector MV as determined by the motion vector determining unit 2530, based on reference values from the reference value determining unit 2570. The error correcting unit 2550 can be configured to determine whether a currently determined motion vector MV is consistent with previously determined, or peripheral, motion vectors and, if needed, to correct the motion vector MV so that it is consistent with peripheral motion vectors. The determining unit 2560 can be configured to select compressed/reconstructed data of a previous image PREV_REC or raw data of a current image CURR_ORG for output as the previous image data signal PREV of the DCC circuit 2600, based on the determinations made by at least one of the results of the still image judging unit 2520, the matching judging unit 2540, and the error correcting unit 2550. The reference value determining unit 2570 can be configured to determine reference values being provided to the matching judging unit 2540 based on the current mode of operation of the data compression and reconstruction block 2300. Information indicating the mode of operation of the type of data compression being used can be provided from the data compression and reconstruction block 2300 (see FIG. 3) or embedded or otherwise included in compressed/reconstructed data of a previous image PREV_REC. Each mode of error compression has a unique error rate. The lossless data selection unit 2500 receives the error rate from the data compression and reconstruction block 2300 to make a decision whether to output the raw data of the current image CURR_ORG or the compressed/reconstructed data of a previous image PREV_REC as the received previous data PREV that is received by the DCC circuit 2600.

FIGS. 6 to 12 are diagrams that describe an exemplary operation of a lossless data selection unit 2500 according to an exemplary embodiment of the inventive concept. Hereinafter, operations of elements of the lossless data selection unit 2500 will be more fully described with reference to FIGS. 6 to 12.

Figure 6:
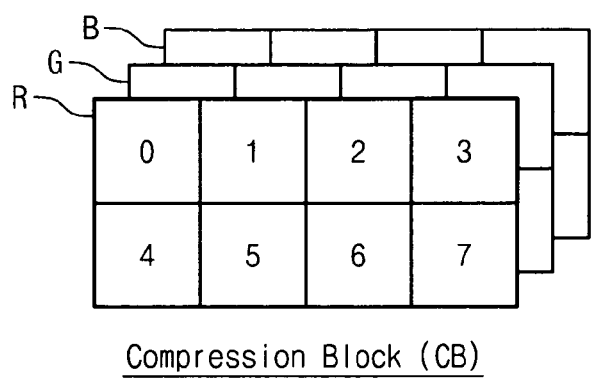
FIGS. 6 to 12 are diagrams that describe an exemplary operation of a lossless data selection unit according to an exemplary embodiment of the inventive concept.

It is assumed that a data compression and reconstruction block 2300 compresses pixel data in a block unit (for example, a compression block comprising 4×2 data elements). That is, in the event that a compression block includes three color components R, G, and B and that the size of the compression block is 4×2, as illustrated in FIG. 6, a 4×2 compression block can be formed of three compression blocks each corresponding to color components R, G, and B. For ease of description, a pixel value of a compression block can be expressed by a format of [color][k]. Herein, the parameter [color] indicates a color component of each pixel in a compression block, and the parameter [k] indicates a location of each pixel in the compression block. When pixel data of a current image corresponding to a compression block is transferred from the line buffer 2200 to the encoder/decoder unit 2310, a corresponding compression block of a previous image stored in a memory 2400 is transferred to the decoder unit 2320. Pixel data of a current image/frame CURR_REC that is compressed and reconstructed by the encoder/decoder unit 2310 and pixel data of a previous image/frame PREV_REC that is reconstructed by the decoder unit 2320 can be provided to a lossless data selection unit 2500, as shown.

Judgment of Still Image

A still image judging unit 2520 can operate to determine whether a current image is a still image, based on compressed/reconstructed data of a current image/frame CURR_REC and compressed/reconstructed data of a previous image/frame PREV_REC. This can be accomplished by the following formula (1).

$$\text{diff\_value} = \sum_{RGB}^{k=Nblock-1} \sum_{k=0} |PREV\_REC[color][k] - CURR\_REC[color][k]| \quad (1)$$

In the formula (1), 'Nblock' indicates the number of pixels in a compression block. For example, when a size of a compression block is 4×2, the parameter Nblock is set to 8.

Figure 7:
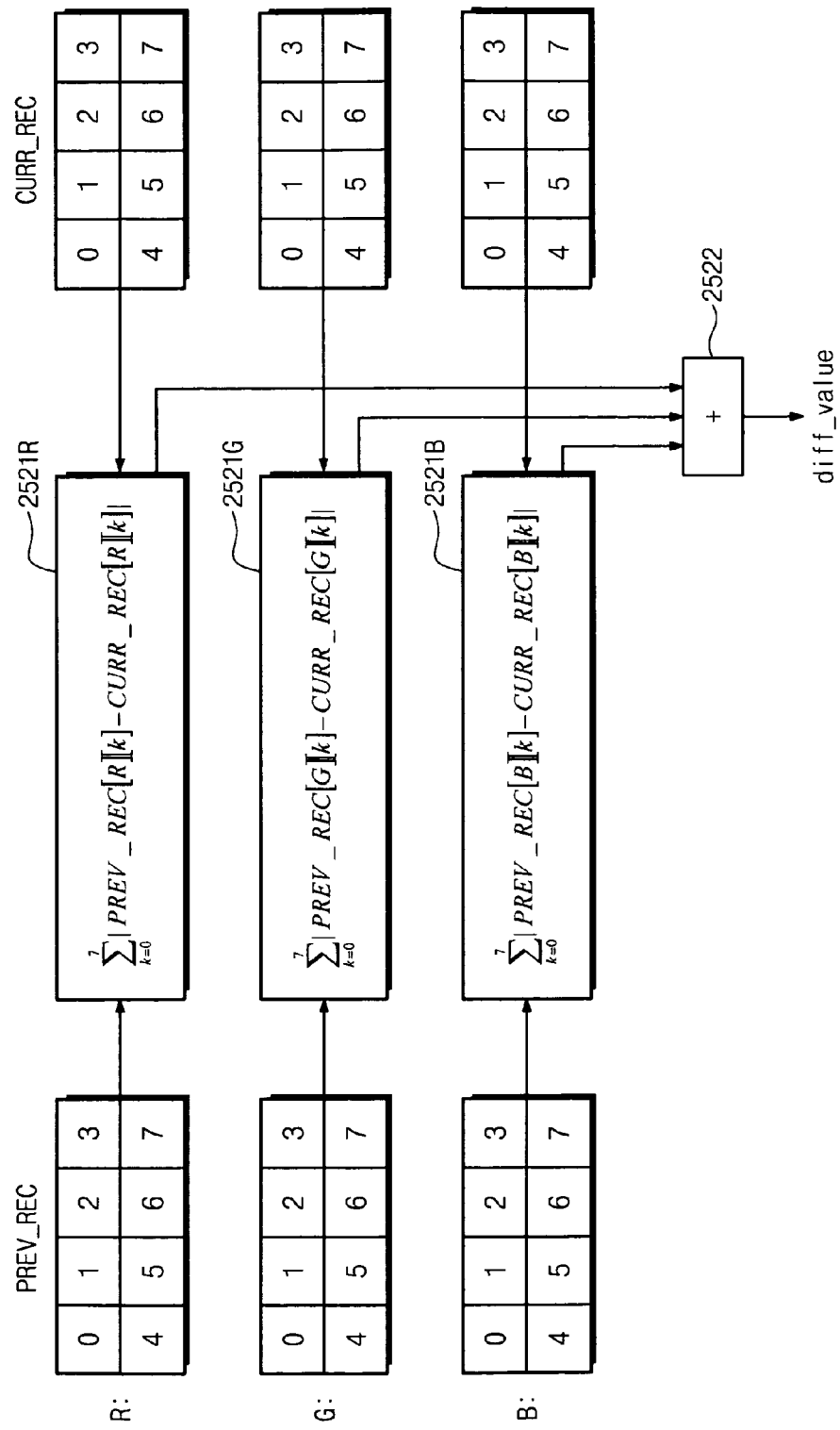

An operation of judging a still image is schematically illustrated in FIG. 7. It is understood from FIG. 7 that each color component is calculated in the same manner. In each color component, as illustrated in FIG. 7, a sum, or a sum of an absolute value, of differences between values of pixels [0]~[7] in a compression block of a previous image and values of pixels [0]~[7] in a compression block of a current image can be obtained by a calculator 2521R/2521G/2521B. Values thus obtained can be added by an adder 2522, and the added value diff_value may correspond to a result of the formula (1). In one example, if the resulting value diff_value is '0', a current image may be determined to be a still image. This is because current and previous compression blocks of images provided to the data compression and reconstruction block 2300 are determined to be identical to each other. When the value diff_value is '0', the still image judging unit 2520 can provide a hit signal Still$_{hit}$ indicating that the current image block is a still image to a determining unit 2560, together with the value diff_value. In one embodiment, a hit signal Still$_{hit}$ of '1' is used to indicate a still image, and a hit signal Still$_{hit}$ of '0' is used to indicate a moving image.

Determination of Motion Vector

A motion vector determining unit 2530 can be configured to determine a motion vector MV with respect to a compression block of a current image which is most identical with compressed/reconstructed data of a previous image PREV_REC within a motion estimation range, or within a search range, of a current image. In an exemplary embodiment, a motion vector MV may be determined using a Sum of Absolute values of Differences (SAD) process, which offers relatively high accuracy and relatively low operation complexity. In another embodiment, a Sum of Square value of Differences (SSD) operation can be used to determine a motion vector MV. It is well understood that a manner of determining a motion vector MV is not limited to these approaches, and any of a number of suitable approaches can apply.

Figure 8:
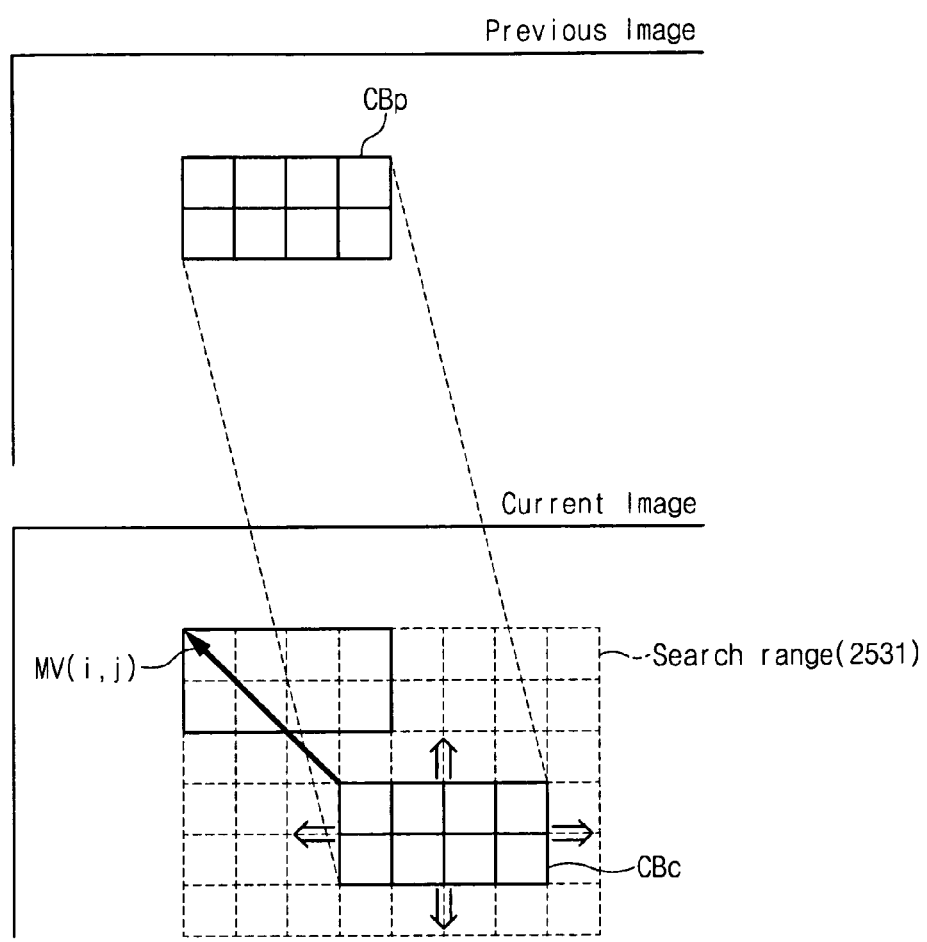

As illustrated in FIG. 8, SAD values can be calculated according to the following formula (2), with a compression block CBp of a previous image being shifted in given directions within a motion estimation range 2531 of a current image, respectively. The minimum SAD value min(SAD$_{(i,j)}$) of the various SAD values can be selected. That is, as understood from the following formula (3), a motion vector MV$_{(i,j)}$ may be determined based on the minimal SAD value of the compression block. The thus determined motion vector MV$_{(i,j)}$ can be provided to a matching judging unit 2540.

$$SAD_{(i,j)} = \sum_{k=0}^{RGB} \sum_{k=0}^{Nblock-1} |PREV\_REC[color][k] - CURR\_ORG_{(i,j)}[color][k]| \quad (2)$$

$$MV(i, j) = \min(SAD_{(i,j)}) \quad (3)$$

Judgment of Matching

Although a motion vector MV$_{(i,j)}$ of a compression block corresponding to the least SAD value can be determined as described above, it is difficult to guarantee whether the determined motion vector MV$_{(i,j)}$ of a candidate block corresponding to the motion vector MV$_{(i,j)}$ is exactly identical to compressed/reconstructed data of a previous image. For this reason, it is necessary to verify the matching with respect to the determined motion vector MV$_{(i,j)}$. This can be accomplished according to the following formulas. Such motion vector matching can be judged, for example, on the basis of at least one of pixel matching, color matching, frequency matching, and compression block matching.

[Pixel Matching]

The matching of pixels in a compression block of a current image corresponding to the motion vector MV$_{(i,j)}$ can be determined according to the following formulas (4)-(6).

$$|PREV\_REC[color][k]-MV(i,j)[color][k]| \leq TH_{mode} \rightarrow color_{hit}=1 \quad (4)$$

$$|PREV\_REC[color][k]-MV(i,j)[color][k]| > TH_{mode} \rightarrow color_{hit}=0 \quad (5)$$

$$R_{hit}=1, B_{hit}=1, B_{hit}=1 \rightarrow Pixel_{hit}[k]=1, \text{else} \rightarrow Pixel_{hit}[k]=0 \quad (6)$$

Figure 9:
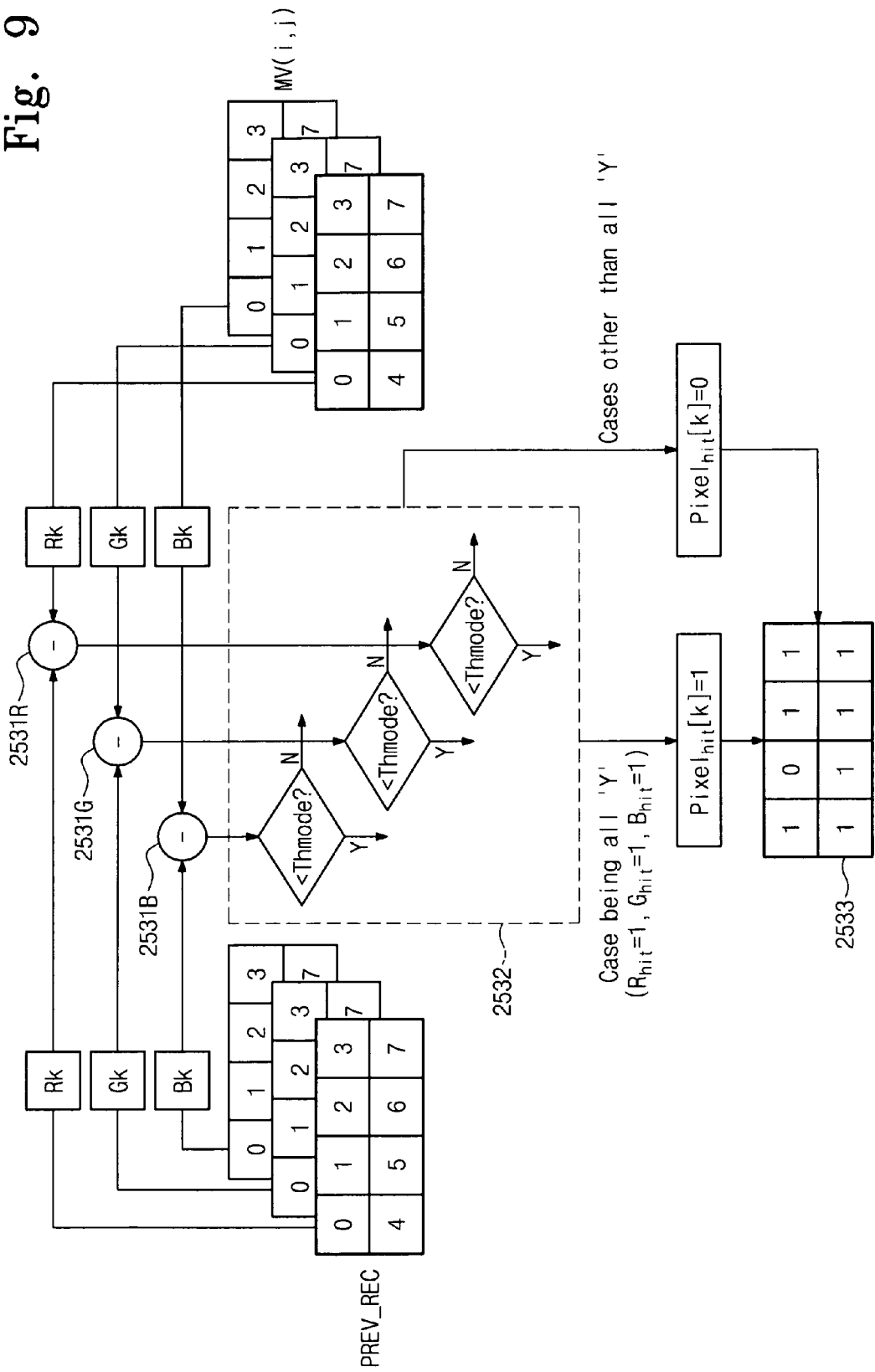

Below, an operation of determining the pixel matching can be more fully described with reference to FIG. 9 and the above formulas (4)-(6). In FIG. 9, MV$_{(i,j)}$ refers to a compression block of a current image which has not been compressed and reconstructed. This may be stored in a register 2510.

First, referring to FIG. 9, a subtractor 2531R can obtain a difference between the first pixel value R0 of a previous image corresponding to a color component R and the first pixel value R0 of a current image corresponding to a color component R. Likewise, a difference between the first pixel value G0 of a previous image corresponding to a color component G and the first pixel value G0 of a current image corresponding to a color component G can be calculated by a subtractor 2531G. A difference between the first pixel value B0 of a previous image corresponding to a color component B and the first pixel value B0 of a current image corresponding to a color component B can be calculated by a subtractor 2531B. Whether each of differences for the first pixel is less than a reference value Thmode, can be determined by a judging unit 2532. In a case where each Of differences for the first pixel is judged to be less than the reference value Thmode, that is, when R$_{hit}$=1, G$_{hit}$=1, and B$_{hit}$=1, the resulting hit value Pixel$_{hit}$[k] for the first pixel can be determined to be a '1'. If not, the resulting hit value Pixel$_{hit}$[k] can be determined to be a '0'.

In an exemplary embodiment, hit values of pixels [0]~[7] can be calculated sequentially or simultaneously according to the same manner as above described. Hit values (refer to table 2533 in FIG. 9) thus calculated, or a sum of the hit values, can be provided to the determining unit 2560. In one embodiment, the reference value Thmode can be determined by a reference value determining unit 2570 according to an error rate of a selected one of modes used by the data compression and reconstruction block 2300. In an exemplary embodiment, the reference value Thmode can have different values for each color R, G, B.

In various embodiments, it is possible to increase the accuracy of the matching and to flexibly adapt to the compression engine by considering the mode of operation when determining whether or not pixel matching has occurred.

[Color Matching]

Color matching can be determined based on an average value Avg_R$_{prev}$ of compressed/reconstructed data of a previous image and an average value Avg_R$_{MV(i,j)}$ of raw data of a current image corresponding to a selected motion vector MV$_{(i,j)}$. The average values Avg_R$_{prev}$ and Avg_R$_{MV(i,j)}$ can be calculated according to the following formulas (7) and (8). The following formulas (7) and (8) can be related to an R component, and average values of remaining color components G and B can be calculated in the same manner as the R component.

$$\text{Avg\_R}_{prev} = \left( \sum_{k=0}^{k=Nblock} \text{PREV\_REC}[R][K] \right) / N_{block} \qquad (7)$$

$$\text{Avg\_R}_{prev} = \left( \sum_{k=0}^{k=Nblock} \text{PREV\_REC}[R][K] \right) / N_{block} \qquad (8)$$

In a case where the difference of the averages $\text{Avg\_R}_{prev}$ and $\text{Avg\_R}_{MV(i,j)}$ of the R component is less than a reference value TH_Rmode, a hit value for the R component can be determined to be '1'. On the other hand, if the difference of the averages $\text{Avg\_R}_{prev}$ and $\text{Avg\_R}_{MV(i,j)}$ of the R component is greater than a reference value TH_Rmode, a hit value for the R component can be determined to be '0'. This can be expressed by the following formulas (9) and (10).

$$|\text{Avg\_R}_{prev} - \text{Avg\_R}_{(MV(i,j))}| \leq TH\_R_{mode} \rightarrow \text{Avg\_} R_{hit} = 1 \qquad (9)$$

$$|\text{Avg\_R}_{prev} - \text{Avg\_R}_{(MV(i,j))}| > TH\_R_{mode} \rightarrow \text{Avg\_} R_{hit} = 0 \qquad (10)$$

Below, an operation of judging the matching of a color component will be more fully described with reference to FIG. 10 and the formulas (7)-(10).

Figure 10:
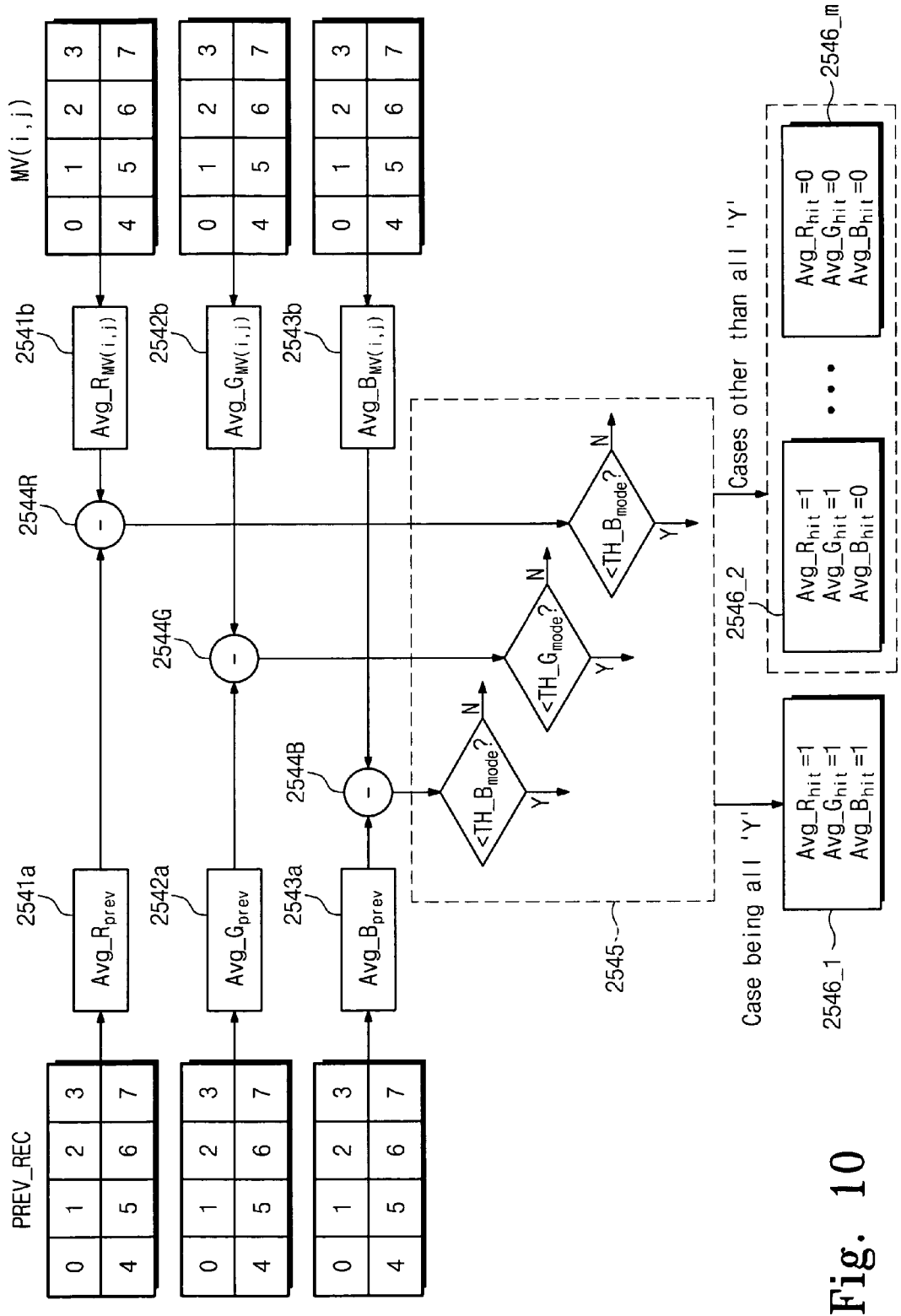

First, referring to FIG. 10, average values $\text{Avg\_R}_{prev}$ and $\text{Avg\_R}_{MV(i,j)}$ of the R component can be calculated respectively by calculators 2541a and 2541b, and a difference between the average values $\text{Avg\_R}_{prev}$ and $\text{Avg\_R}_{MV(i,j)}$ can be calculated by a subtractor 2544R. Likewise, average values $\text{Avg\_G}_{prev}$ and $\text{Avg\_G}_{MV(i,j)}$ of the G component can be calculated respectively by calculators 2542a and 2542b, and a difference between the average values $\text{Avg\_G}_{prev}$ and $\text{Avg\_G}_{MV(i,j)}$ can be calculated by a subtractor 2544G. Average values $\text{Avg\_B}_{prev}$ and $\text{Avg\_B}_{MV(i,j)}$ of the B component can be calculated respectively by calculators 2543a and 2543b, and a difference between the average values $\text{Avg\_B}_{prev}$ and $\text{Avg\_B}_{MV(i,j)}$ can be calculated by a subtractor 2544B. In various embodiments, the above-described operations can be carried out sequentially or simultaneously, as desired.

A judging unit 2545 determines whether differences thus calculated are less than corresponding reference values TH_Rmode, TH_Gmode, and TH_Bmode. If a difference corresponding to the R component is judged to be less than the reference value TH_Rmode, a hit signal $\text{Avg\_R}_{hit}$ indicating the matching of the R component can be set to '1'. If not, it may be set to '0'. Likewise, hit signals $\text{Avg\_G}_{hit}$ and $\text{Avg\_B}_{hit}$ indicating the matching of remaining color components G and B may be determined in the same manner as described above. A table 2546_i (i=1~m) of the hit signals $\text{Avg\_R}_{hit}$, $\text{Avg\_G}_{hit}$, and $\text{Avg\_B}_{hit}$ indicating the matching of the color components R, G, and B can be provided to the determining unit 2560.

In an exemplary embodiment, the reference values TH_Rmode, TH_Gmode, and TH_Bmode may be set to have identical or different values.

[Frequency Matching]

The matching of a frequency component may be determined according to the following formulas (11)-(15).

$$\text{PREV\_REC}[R][k] \leq \text{Avg\_R}_{prev} \rightarrow R\_\text{Freq}_{prev}[k] = H \qquad (11)$$

$$\text{PREV\_REC}[R][k] < \text{Avg\_R}_{prev} \rightarrow R\_\text{Freq}_{prev}[k] = L \qquad (12)$$

$$MV(i,j)[R][k] \leq \text{Avg\_R}_{MV(i,j)} \rightarrow R\_\text{Freq}_{MV(i,j)}[k] = H \qquad (13)$$

$$MV(i,j)[R][k] < \text{Avg\_R}_{MV(i,j)} \rightarrow R\_\text{Freq}_{MV(i,j)}[k] = L \qquad (14)$$

$$R\_\text{Freq}_{prev}[k] = R\_\text{Freq}_{MV(i,j)}[k] \rightarrow \text{Freq\_}R_{hit}[k] = 1 \qquad (15)$$

Figure 11:
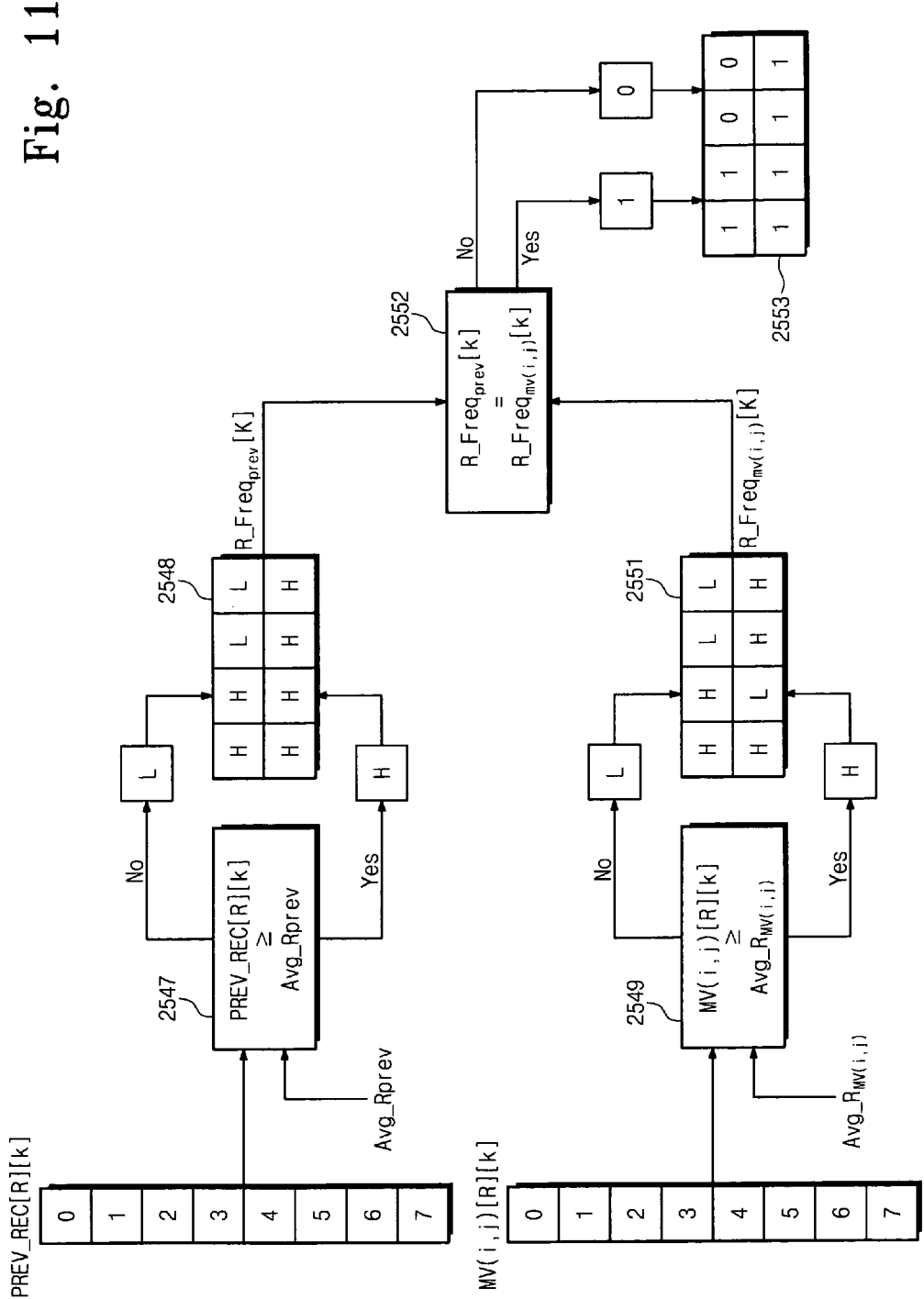

Below, an operation of judging the matching of a frequency component will be more fully described with reference to FIG. 11 and the formulas (11)-(15).

First, a frequency characteristic can be calculated for pixels present in a compression block of a current raw image, which has not been compressed and restructured, and a frequency characteristic can be calculated for pixels present in a compression block of a previous image which has been compressed and reconstructed. A frequency characteristic for respective pixels in a compression block of a previous image that has been compressed/reconstructed can be determined according to whether a value of each pixel in a compression block of a previous image is more than the average value $\text{Avg\_R}_{prev}$ calculated by the formula (7). For example, referring to FIG. 11, whether a value of a pixel [0] in a compression block of a previous image that was compressed and reconstructed is more than the average value $\text{Avg\_R}_{prev}$ can be determined by a judging unit 2547. If a value of a pixel [0] in a compression block of a previous image is determined to be more than the average value $\text{Avg\_R}_{prev}$, the frequency characteristic for that pixel can be determined to be 'High'. If a value of a pixel [0] in a compression block of a previous image is determined to be less than the average value $\text{Avg\_R}_{prev}$, the frequency characteristic for that pixel can be determined to be 'Low'. Frequency characteristics of remaining pixels can be determined in the same manner as described above. Frequency characteristics thus determined can constitute a table 2548 in FIG. 11. This table 2548 indicates the frequency characteristic $R\_\text{Freq}_{prev}[k]$ of the R component in a compression block of a previous image/frame.

A frequency characteristic for respective pixels present in a compression block of a current image, which is not compressed/reconstructed, may similarly be determined according to whether a value of each pixel in a compression block of a current image is more than the average value $\text{Avg\_R}_{mv(i,j)}$, as calculated by the formula (8). For example, referring to FIG. 11, whether a value of a pixel [0] in a compression block of a current image is more than the average value $\text{Avg\_R}_{mv(i,j)}$ can be judged by a judging unit 2549. If a value of a pixel [0] in a compression block of a current image is determined to be more than the average value $\text{Avg\_R}_{mv(i,j)}$, a frequency characteristic for that pixel can be determined to be 'High'. If a value of a pixel [0] in a compression block of a previous image is determined to be less than the average value $\text{Avg\_R}_{mv(i,j)}$, a frequency characteristic for that pixel can be determined to be 'Low'. Frequency characteristics of remaining pixels may be determined in the same manner as described above. Frequency characteristics thus determined can constitute a table 2551 in FIG. 11. This table 2551 indicates the frequency characteristic $R\_\text{Freq}_{mv(i,j)}[k]$ of the R component in a compression block of a current image/frame.

Frequency matching can be determined in response to the resulting frequency characteristic $R\_\text{Freq}_{prev}[k]$ of pixels in a compression block of a current image and the resulting frequency characteristic $R\_\text{Freq}_{MV(i,j)}[k]$ of pixels in a compression block of a previous image. As illustrated in FIG. 11, a judging unit 2552 can determine whether the frequency characteristic of each of pixels in a compression block of a current image is identical to the frequency characteristic of each of pixels in a compression block of a previous image. For example, if the frequency characteristic of a pixel [0] in a compression block of a current image is determined to be identical to the frequency characteristic of a pixel [0] in a compression block of a previous image, a value indicating the frequency matching of the pixel [0] may be set to '1'. On the other hand, if the frequency characteristic of a pixel [0] in a compression block of a current image is judged not to be identical to the frequency characteristic of a pixel [0] in a compression block of a previous image, a value indicating the frequency matching of the pixel [0] may be set to '0'. The frequency matching of pixels [0]-[7] in a compression block can be expressed by a table 2553 in FIG. 11. This table 2553 can indicate the frequency matching Freq_R$_{hit}$[k] of the R component of a compression block and can be made available to the determining unit 2560.

The frequency matching for the G and B components may be determined in the same manner as described above, and description thereof is thus omitted.

Judgment of frequency matching in this manner suppresses the side effect of flickering which can be caused by selecting lossless data. Although lossless data has a relatively small pixel error, the frequency distribution of the block of lossless data is not matched well with the PREY data that is output by the lossless data selection unit 2500. A majority of the flickering phenomenon is caused by a large frequency distribution of the compression block. Frequency matching utilizes the level distribution of the compression block, whereby individual pixel error is distributed over the entire compression block, thereby reducing the flickering of particular pixels.

[Compression Block Matching]

Compression block matching can be determined by confirming whether an SAD value is less than a reference value determined according to an error rate of a selected mode. In one example embodiment, the compression block matching can be determined according to the following formula (16).

$$SAD_{MV(i,j)} \leq TH_{SAD} \rightarrow Block_{hit}=1, else \rightarrow Block_{hit}=0 \quad (16)$$

In formula (16), if the SAD value of the motion vector of the present compression block is determined to be less than a reference value $TH_{SAD}$ that is in turn determined according to an error rate of a selected mode, a compression block matching value Block$_{hit}$ can be set to '1'. On the other hand, if the SAD value is determined to be more than the reference value $TH_{SAD}$, the compression block matching value can be set to '0'. The value Block$_{hit}$ can be provided to the determining unit 2560.

Error Correction

Figure 12:
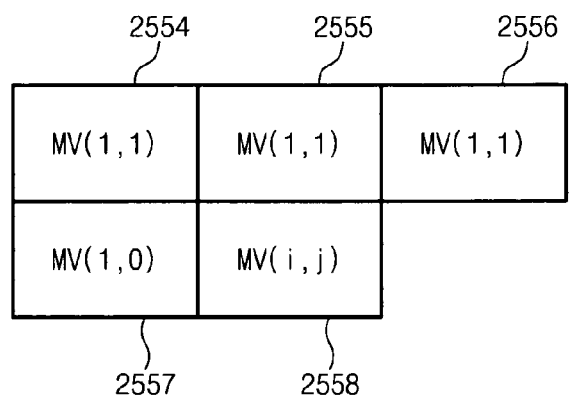

An error correcting unit 2550 can be used to correct errors that occur in the motion vector determining unit 2530 and a matching judging unit 2540. This can improve the reliability of a selected/determined motion vector MV$_{(i,j)}$. Referring to FIG. 12, the error correcting unit 2550 can determine whether the selected motion vector 2558 is consistent with peripheral motion vectors 2554~2557. The peripheral motion vectors 2554~2557 may, for example, be related to previously processed compression blocks. In one example, four motion vectors can be used to determine error correction. If the selected motion vector 2558 is determined to be inconsistent with the peripheral motion vectors 2554~2557, no error correction is to be performed. On the other hand, if the selected motion vector 2558 is determined to be consistent with the peripheral motion vectors 2554~2557, a motion vector can be estimated from the peripheral motion vectors 2554~2557. Whether the selected motion vector 2558 is consistent with the peripheral motion vectors 2554~2557 can, for example, be determined based on whether the peripheral motion vectors 2554~2557 are identical to one another, or, for example, whether a portion or portions of the peripheral motion vectors 2554~2557 is/are identical to one another. Approaches used to perform error correction by estimating whether a selected motion vector is identical to peripheral motion vectors can include, for example, SAD error correction and matching error correction.

SAD error correction can be performed by calculating an SAD value for a compression block of a current image corresponding to the estimated motion vector and by determining whether the calculated SAD value is less than a reference value. This approach can be substantially similar to an operation of judging the compression block matching, as described above in connection with formula (16), and description thereof is thus omitted. The determination result may be provided to the determining unit 2560.

Matching error correction can be performed by determining matching for the estimated motion vector. This approach can be substantially similar to an operation of judging the pixel matching, the color matching, and the frequency matching, and description thereof is thus omitted. The determination result of the matching error correction can be provided to the determining unit 2560.

Determination

Referring back to FIG. 5, the determining unit 2560 can be provided with at least one of the result output by the still image judging unit 2520, the result output by the matching judging unit 2540, and the result output by the error correcting unit 2550. The determining unit 2560 operates to determine which data will be transmitted as the previous image data PREV to the DCC circuit 2600. In one example, the determination is made in accordance with a priority of the received results. In one example, the result of the still image judging unit 2520 can have the first, highest priority.

First, the determining unit 2560 can operate to determine whether a current image is a still image, based on the result output by the still image judging unit 2520, that is, a hit signal Still$_{hit}$. If the hit signal Still$_{hit}$ is a value of '1', the determining unit 2560 can operate to select a compression block of a current image, that is, raw or lossless data that has not been compressed and reconstructed, as the previous image data PREY to be output to the DCC circuit 2600. Data thus selected is provided to the DCC circuit 2600. The raw data that has not been compressed and reconstructed can be selected from a register 2510 based on a selected motion vector MV$_{(i,j)}$. In this case, the DCC circuit 2600 will not perform its compensation operation, since the two input values CURR and PREV to the DCC circuit 2600 will be identical to each other. In the event that a compression block of a current block is determined to be a still image, no deterioration of the picture quality will occur as a result of the data compression operation.

In a case where the hit signal Still$_{hit}$ is determined to be '0', the determining unit 2560 can next determine whether the difference value diff_value is less than a reference value and whether the selected motion vector MV$_{(i,j)}$ indicates a still position MV$_{(0,0)}$. This approach can accommodate, for example, errors in the difference value diff_value that have occurred due to noise. Although the hit signal Still$_{hit}$ is determined to be not a perfect match, or '0', it is still possible to determine that a current image is a still image. For example, when the difference value diff_value is less than the reference value and the selected motion vector MV$_{(i,j)}$ indicates a still position MV$_{(0,0)}$, the determining unit 2560 may operate to determine the current image to be a still image. In this case, the determining unit 2560 can select a compression block of a current image, that is, raw, or lossless, data that has not been compressed or reconstructed, as previous image data PREV to be output to the DCC circuit 2600. As described above, the raw data that has not been compressed and reconstructed can be selected from a register 2510 based on a selected motion vector $MV_{(i,j)}$.

In the event a current image is determined to not qualify as a still image, the determining unit 2560 can next determine whether a result of the matching judging unit 2540 satisfies a given condition. The result of the matching judging unit 2540, as described above, can indicate the result of the pixel matching, the color matching, the frequency matching, or the compression block matching operations. In one example, pixel matching can be determined to be a hit when hit values Pixelhit[k] of pixels in each color component all indicate '1', or, alternatively when a sum of the hit values of pixels is greater than a reference value. The color matching can be determined to be a hit when average values $Avg\_R_{hit}$, $Avg\_G_{hit}$, and $Avg\_B_{hit}$ of color components all indicate '1', or alternatively, when a sum of the average values $Avg\_R_{hit}$, $Avg\_G_{hit}$, and $Avg\_B_{hit}$ is greater than a reference value. The frequency matching can be determined to be a hit when frequency characteristics $Freq\_R_{hit}[k]$, $Freq\_G_{hit}[k]$, and $Freq\_B_{hit}[k]$ of color components all indicate '1', or alternatively, when a sum of the frequency characteristics is greater than a reference value. The compression block matching can be determined to be a hit when a value $Block_{hit}$ indicating the matching of a compression block is '1'.

When any or all of the received determination results (pixel matching, color matching, frequency matching, compression block matching) satisfy the above-described hit conditions, the determining unit 2560 can determine the selected motion vector $MV_{(i,j)}$ to be valid. Accordingly, a compression block of a current image corresponding to the selected motion vector $MV_{(i,j)}$ can be selected. In this case, the determining unit 2560 can select a compression block of a current image, that is, raw, or lossless, data that has not been compressed or reconstructed, as previous image data PREV to be output to the DCC circuit 2600.

In another embodiment, when any or all of the received determination results (pixel matching, color matching, frequency matching, compression block matching) satisfy an allowable range of the hit conditions, the determining unit 2560 can determine the selected motion vector $MV_{(i,j)}$ to be valid. Otherwise, the selected motion vector $MV_{(i,j)}$ can be judged to be invalid.

In still another embodiment, any or all of the received determination results (pixel matching, color matching, frequency matching, compression block matching) satisfy the hit conditions, or satisfy the allowable range of the hit conditions, and when the selected motion vector $MV_{(i,j)}$ is identical, or substantially similar, to a motion vector estimated by an error correcting unit 2550, the determining unit 2560 may determine the selected motion vector $MV_{(i,j)}$ to be valid. In this case, the estimated motion vector may also satisfy the above-described hit conditions, or satisfy the allowable range of the hit conditions.

In still another embodiment, when the received determination results (pixel matching, color matching, frequency matching, compression block matching) satisfy the hit conditions, or satisfy the allowable range of the hit conditions, the determining unit 2560 may determine whether the motion vector that is estimated and corrected by the error correcting unit 2550 is valid. If this condition is satisfied, the selected motion vector $MV_{(i,j)}$ can be determined to be valid. Validity of the estimated motion vector can be determined based on the above-described hit conditions. That is, validity of the estimated motion vector may be determined according to whether it satisfies the above-described hit conditions, or satisfies the allowable range of the hit conditions. If the hit conditions are not satisfied, the corrected and estimated motion vector may be determined to be invalid.

In the event the motion vector determined to be invalid, the determining unit 2560 can select compressed and reconstructed data of a previous image PREV_REC to be output to the DCC circuit 2600 as previous image data PREV.

Figure 13:
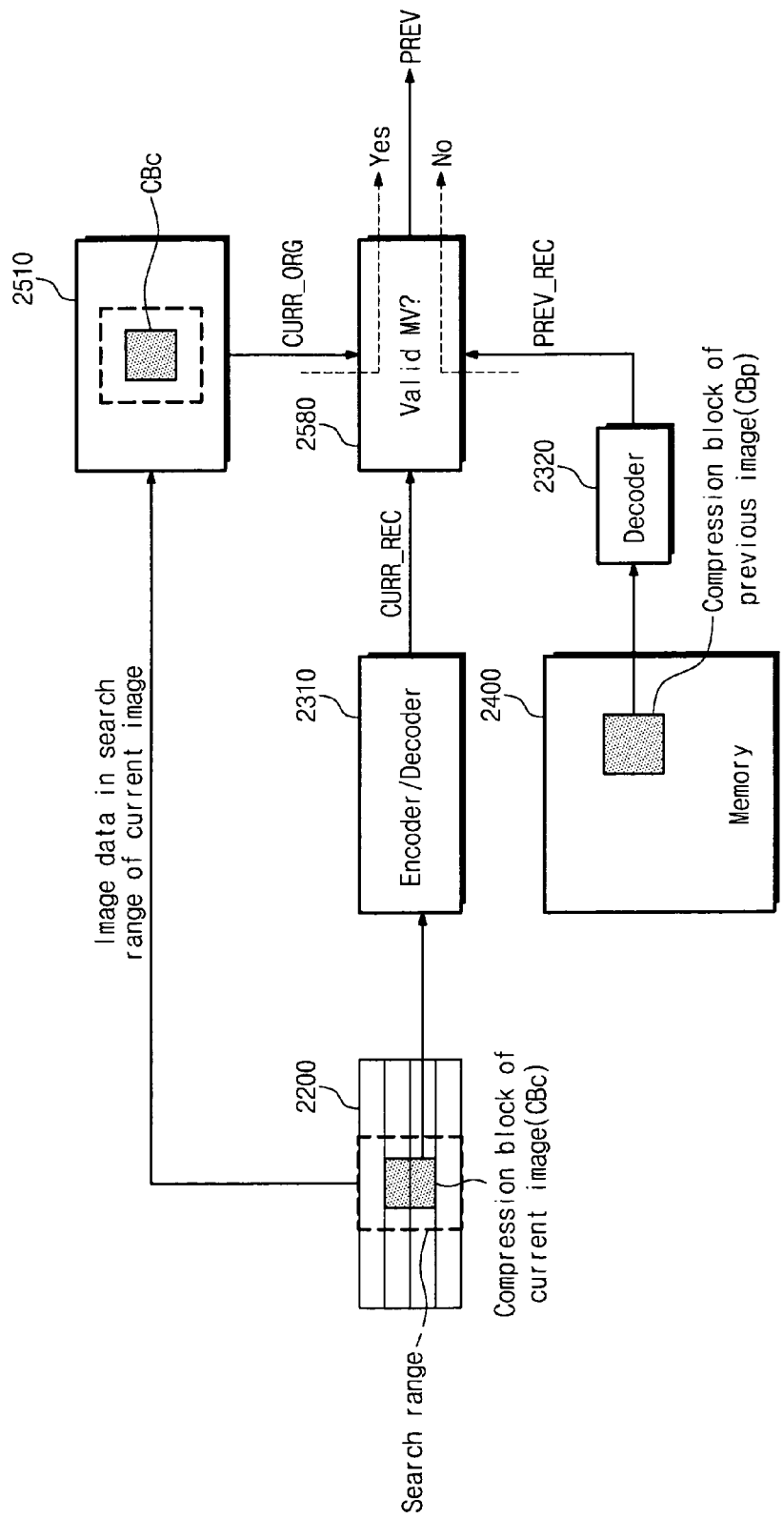
FIG. 13 is a diagram that describes an operation of a display system according to an exemplary embodiment of the inventive concept.

FIG. 13 is a diagram that describes an operation of a display system according to an exemplary embodiment of the inventive concept.

Image data, for example image data consisting of a plurality of lines, including a search range or a motion estimation range of a compression block, can be stored temporarily in a line buffer 2200. At that time, a DCC circuit 2600 (see FIG. 3) operates in response to a compression block CBc of a current image/frame and a compression block CBp of a previous image/frame, under the control of a controller 2100. In particular, compressed and reconstructed data of a previous image or raw data of a current image can be provided as an input of the DCC circuit, that is, as previous image data PREV thereof.

The image data stored in a line buffer 2200 is sent to a register 2510 under the control of the controller 2100 (see FIG. 3). Next, a compression block CBc of a current image may be provided to an encoder/decoder unit 2310, and a compression block CBp of a previous image stored in a memory 2400 is provided to a decoder unit 2320. The encoder/decoder unit 2310 operates to provide compressed/reconstructed data of a current image CURR_REC to a valid motion vector judging unit 2580, and the decoder unit 2320 provides compressed/reconstructed data of a previous image PREV_REC to the valid motion vector judging unit 2580. In addition, raw original data of a current image CURR_ORG stored in the register 2510 can also be provided to the valid motion vector judging unit 2580.

The valid motion vector judging unit 2580 can be configured to calculate a motion vector MV on the basis of compressed/reconstructed data PREV_REC of a previous image and to judge whether the calculated motion vector MV is valid. Operations for determining whether the calculated motion vector MV is valid are described in detail above. In the event the calculated motion vector MV is determined to be valid, the valid motion vector judging unit 2580 can select raw, or lossless, original data of a current image CURR_ORG corresponding to the valid motion vector MV, to be output as previous image data PREV of the DCC circuit 2600. Herein, the calculated motion vector MV can be a motion vector as determined by a motion vector determining unit 2530 or a motion vector as estimated and corrected by an error correcting unit 2550. In the event the calculated motion vector MV is determined to be invalid, the valid motion vector judging unit 2580 can select compressed/reconstructed data of a previous image PREV_REC, to be output as previous image data PREV of the DCC circuit 2600. In one embodiment, the valid motion vector judging unit 2580 can be formed of elements 2520~2570 illustrated in FIG. 5.

In accordance with the above embodiments of the inventive concept, it is possible to improve the picture quality of a display system that utilizes data compression. This is accomplished by providing raw data of a current image in certain cases, rather than compressed/reconstructed data, to an input of the DCC circuit 2600, that is, as previous image data PREV of the DCC circuit. In systems that perform a high level of data compression, the resulting image quality becomes poor due to compression error and flickering issues. Embodiments of the present inventive concept utilize raw data of a current image when possible to thereby minimize compression error; hence a high-quality image can be obtained.

The above-disclosed subject matter is to be considered illustrative, and not restrictive, and the appended claims are intended to cover all such modifications, enhancements, and other embodiments, which fall within the true spirit and scope. Thus, the scope is to be determined by the broadest permissible interpretation of the following claims and their equivalents, and shall not be restricted or limited by the foregoing detailed description.

What is claimed is:

1. An image data processing device, comprising:
a selection unit that receives a block of original image data of a current image, a block of compressed and reconstructed image data of the current image, and a block of compressed and reconstructed data of a previous image that precedes the current image;
a comparison unit that compares the block of compressed and reconstructed image data of the current image with the block of compressed and reconstructed data of the previous image; and
an output unit that, in the event that the comparison of the comparison unit results in a match, outputs the block of original image data of the current image as first output data, and that, in the event that the comparison of the comparison unit does not result in a match, outputs the block of compressed and reconstructed data of the previous image as the first output data.

2. The image data processing device of claim 1 further comprising a dynamic capacitance compensation (DCC) circuit comprising:
a first input that receives the block of original image data of the current image;
a second input that receives the first output data output by the output unit; and
a converter unit that generates compensated image data based on differences between the block of original image data of the current image and the first output data output by the output unit.

3. The image data processing device of claim 1 wherein the comparison unit compares the block of compressed and reconstructed image data of the current image with the block of compressed and reconstructed data of the previous image by:
comparing pixel values of pixels of the block of compressed and reconstructed image data of the current image with corresponding pixel values of pixels of the block of compressed and reconstructed data of the previous image; and
in the event that the pixel values are similar within an acceptable limit, determining the result of the comparison to be a match.

4. The image data processing device of claim 1 wherein the comparison unit compares the block of compressed and reconstructed image data of the current image with the block of compressed and reconstructed data of the previous image by:
computing a motion vector of the block of original image data of the current image relative to the block of compressed and reconstructed data of the previous image;
comparing pixel values of pixels of the motion vector with corresponding pixel values of pixels of the block of compressed and reconstructed data of the previous image; and
in the event that the pixel values are similar within an acceptable limit, determining the result of the comparison to be a match.

5. The image data processing device of claim 1 wherein the comparison unit compares the block of compressed and reconstructed image data of the current image with the block of compressed and reconstructed data of a previous image by:
computing a motion vector of the block of original image data of the current image relative to the block of compressed and reconstructed data of the previous image;
comparing color values of the motion vector with color values of the block of compressed and reconstructed data of the previous image; and
in the event that the color values are similar within an acceptable limit, determining the result of the comparison to be a match.

6. The image data processing device of claim 1 wherein the comparison unit compares the block of compressed and reconstructed image data of the current image with the block of compressed and reconstructed data of a previous image by:
computing a motion vector of the block of original image data of the current image relative to the block of compressed and reconstructed data of the previous image;
comparing frequency characteristic values of the motion vector with frequency characteristic values of the block of compressed and reconstructed data of the previous image; and
in the event that the frequency characteristic values are similar within an acceptable limit, determining the result of the comparison to be a match.

7. The image data processing device of claim 1 wherein the comparison unit compares the block of compressed and reconstructed image data of the current image with the block of compressed and reconstructed data of a previous image by:
computing a motion vector of the block of original image data of the current image relative to the block of compressed and reconstructed data of the previous image;
computing a sum of absolute differences (SAD) of the motion vector;
comparing the sum of absolute differences of the motion vector to a reference value; and
in the event that the sum of absolute differences (SAD) is less than the reference value, determining the result of the comparison to be a match.

8. An image data display system, comprising:
a timing control unit, comprising:
a selection unit that receives a block of original image data of a current image, a block of compressed and reconstructed image data of the current image, and a block of compressed and reconstructed data of a previous image that precedes the current image;
a comparison unit that compares the block of compressed and reconstructed image data of the current image with the block of compressed and reconstructed data of the previous image; and
an output unit that, in the event that the comparison of the comparison unit results in a match, outputs the block of original image data of the current image as first output data, and that, in the event that the comparison of the comparison unit does not result in a match, outputs the block of compressed and reconstructed data of the previous image as the first output data; and
a dynamic capacitance compensation (DCC) circuit comprising:
a first input that receives the block of original image data of the current image;
a second input that receives the first output data output by the output unit; and a converter unit that generates compensated image data based on differences between the block of original image data of the current image and the first output data output by the output unit; and a display device that displays the compensated image data.

9. The image data display system of claim 8 wherein the comparison unit compares the block of compressed and reconstructed image data of the current image with the block of compressed and reconstructed data of the previous image by:

comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match.

10. The image data display system of claim 8 wherein the comparison unit compares the block of compressed and reconstructed image data of the current image with the block of compressed and reconstructed data of the previous image by:

computing a motion vector of the block of original image data of the current image relative to the block of compressed and reconstructed data of the previous image;

comparing pixel values of pixels of the motion vector with corresponding pixel values of pixels of the block of compressed and reconstructed data of the previous image; and in the event that the pixel values are similar within an acceptable limit, determining the result of the comparison to be a match.

11. The image data display system of claim 8 wherein the comparison unit compares the block of compressed and reconstructed image data of the current image with the block of compressed and reconstructed data of a previous image by:

computing a motion vector of the block of original image data of the current image relative to the block of compressed and reconstructed data of the previous image;

comparing color values of the motion vector with color values of the block of compressed and reconstructed data of the previous image; and in the event that the color values are similar within an acceptable limit, determining the result of the comparison to be a match.

12. The image data display system of claim 8 wherein the comparison unit compares the block of compressed and reconstructed image data of the current image with the block of compressed and reconstructed data of a previous image by:

computing a motion vector of the block of original image data of the current image relative to the block of compressed and reconstructed data of the previous image;

comparing frequency characteristic values of the motion vector with frequency characteristic values of the block of compressed and reconstructed data of the previous image; and in the event that the frequency characteristic values are similar within an acceptable limit, determining the result of the comparison to be a match.

13. The image data display system of claim 8 wherein the comparison unit compares the block of compressed and reconstructed image data of the current image with the block of compressed and reconstructed data of a previous image by:

computing a motion vector of the block of original image data of the current image relative to the block of compressed and reconstructed data of the previous image;

computing a sum of absolute differences (SAD) of the motion vector;

comparing the sum of absolute differences of the motion vector to a reference value; and in the event that the sum of absolute differences (SAD) is less than the reference value, determining the result of the comparison to be a match.

14. A method of processing image data, comprising:

receiving a block of original image data of a current image, a block of compressed and reconstructed image data of the current image, and a block of compressed and reconstructed data of a previous image that precedes the current image;

comparing the block of compressed and reconstructed image data of the current image with the block of compressed and reconstructed data of the previous image; and in the event that the comparing results in a match, outputting the block of original image data of the current image as first output data; and in the event that the comparing does not result in a match, outputting the block of compressed and reconstructed data of the previous image as the first output data.

15. The method of claim 14 further comprising generating compensated image data based on differences between the block of original image data of the current image and the first output data output by the output unit.

16. The method of claim 14 wherein comparing the block of compressed and reconstructed image data of the current image with the block of compressed and reconstructed data of the previous image comprises:

comparing pixel values of pixels of the block of compressed and reconstructed image data of the current image with corresponding pixel values of pixels of the block of compressed and reconstructed data of the previous image; and in the event that the pixel values are similar within an acceptable limit, determining the result of the comparison to be a match.

17. The method of claim 14 wherein comparing the block of compressed and reconstructed image data of the current image with the block of compressed and reconstructed data of the previous image comprises:

computing a motion vector of the block of original image data of the current image relative to the block of compressed and reconstructed data of the previous image;

comparing pixel values of pixels of the motion vector with corresponding pixel values of pixels of the block of compressed and reconstructed data of the previous image; and in the event that the pixel values are similar within an acceptable limit, determining the result of the comparison to be a match.

18. The method of claim 14 wherein comparing the block of compressed and reconstructed image data of the current image with the block of compressed and reconstructed data of a previous image comprises:

computing a motion vector of the block of original image data of the current image relative to the block of compressed and reconstructed data of the previous image;

comparing color values of the motion vector with color values of the block of compressed and reconstructed data of the previous image; and in the event that the color values are similar within an acceptable limit, determining the result of the comparison to be a match.

19. The method of claim 14 wherein comparing the block of compressed and reconstructed image data of the current image with the block of compressed and reconstructed data of a previous image comprises:
- computing a motion vector of the block of original image data of the current image relative to the block of compressed and reconstructed data of the previous image;
- comparing frequency characteristic values of the motion vector with frequency characteristic values of the block of compressed and reconstructed data of the previous image; and
- in the event that the frequency characteristic values are similar within an acceptable limit, determining the result of the comparison to be a match.

20. The method of claim 14 wherein comparing the block of compressed and reconstructed image data of the current image with the block of compressed and reconstructed data of a previous image comprises:
- computing a motion vector of the block of original image data of the current image relative to the block of compressed and reconstructed data of the previous image;
- computing a sum of absolute differences (SAD) of the motion vector;
- comparing the sum of absolute differences of the motion vector to a reference value; and
- in the event that the sum of absolute differences (SAD) is less than the reference value, determining the result of the comparison to be a match.

* * * * *